(12) United States Patent
van Riel et al.

(10) Patent No.: US 8,190,914 B2
(45) Date of Patent: May 29, 2012

(54) METHOD AND SYSTEM FOR DESIGNATING AND HANDLING CONFIDENTIAL MEMORY ALLOCATIONS

(75) Inventors: Henri Han van Riel, Nashua, NH (US); Alan Cox, Research Park (GB)

(73) Assignee: Red Hat, Inc., Raleigh, NC (US)

( * ) Notice: Subject to any disclaimer, the term of this patent is extended or adjusted under 35 U.S.C. 154(b) by 1315 days.

(21) Appl. No.: 11/363,164

(22) Filed: Feb. 28, 2006

(65) Prior Publication Data

US 2007/0208954 A1 Sep. 6, 2007

(51) Int. Cl.
G06F 21/00 (2006.01)

(52) U.S. Cl. .......... 713/193; 711/100; 709/216; 726/27; 726/32

(58) Field of Classification Search .................. 713/168, 713/165, 172, 194, 193, 1, 189, 164; 726/12, 726/24, 34, 2, 26–30, 32–33; 455/558, 453; 360/244; 711/163, 202, 203, 209, 135, 206, 711/166, 100, 101, 112, 147, 153; 709/216
See application file for complete search history.

(56) References Cited

U.S. PATENT DOCUMENTS

| | | | | |
|---|---|---|---|---|
| 4,271,482 A * | 6/1981 | Giraud | | 235/380 |
| 4,646,312 A * | 2/1987 | Goldsbury et al. | | 714/763 |
| 5,390,310 A * | 2/1995 | Welland | | 711/203 |
| 5,909,289 A * | 6/1999 | Shibata et al. | | 358/468 |
| 5,956,751 A * | 9/1999 | Lai | | 711/172 |
| 6,272,637 B1 * | 8/2001 | Little et al. | | 713/194 |
| 6,745,306 B1 * | 6/2004 | Willman et al. | | 711/163 |
| 6,804,763 B1 * | 10/2004 | Stockdale et al. | | 711/170 |
| 6,895,491 B2 * | 5/2005 | Kjos et al. | | 711/203 |
| 7,058,980 B1 * | 6/2006 | Link et al. | | 726/34 |
| 7,260,820 B1 * | 8/2007 | Waldspurger et al. | | 718/1 |
| 7,302,571 B2 * | 11/2007 | Noble et al. | | 713/172 |
| 7,487,367 B2 * | 2/2009 | Belnet et al. | | 711/163 |
| 2002/0095557 A1 * | 7/2002 | Constable et al. | | 711/163 |
| 2002/0165008 A1 * | 11/2002 | Sashihara et al. | | 455/558 |
| 2004/0064668 A1 * | 4/2004 | Kjos et al. | | 711/202 |
| 2004/0152469 A1 * | 8/2004 | Yla-Outinen et al. | | 455/453 |
| 2005/0144402 A1 * | 6/2005 | Beverly | | 711/152 |
| 2006/0004795 A1 * | 1/2006 | Shah et al. | | 707/100 |
| 2006/0085636 A1 * | 4/2006 | Osaki | | 713/165 |
| 2006/0101510 A1 * | 5/2006 | Kadyk et al. | | 726/12 |
| 2006/0181809 A1 * | 8/2006 | Suzuki | | 360/244 |
| 2006/0190729 A1 * | 8/2006 | Uchida | | 713/168 |
| 2006/0294589 A1 * | 12/2006 | Achanta et al. | | 726/24 |
| 2007/0118575 A1 * | 5/2007 | Kanda et al. | | 707/204 |
| 2007/0206798 A1 * | 9/2007 | Isozaki et al. | | 380/277 |
| 2007/0208954 A1 * | 9/2007 | Van Riel et al. | | 713/193 |
| 2008/0215474 A1 * | 9/2008 | Graham | | 705/37 |

* cited by examiner

Primary Examiner — Hadi Armouche
(74) Attorney, Agent, or Firm — Lowenstein Sandler PC

(57) ABSTRACT

Methods and systems for designating and handling confidential memory allocations of virtual memory are provided in which the operating system provides a memory allocation flag that applications may use to indicate any arbitrary area of physical memory marked with this flag may contain confidential data and should be handled accordingly. The operating system also ensures that memory allocated with this flag can be placed in physical memory. When freeing up memory, the operating system protects any data in the memory allocated with this flag. For example, the operating system may prevent the confidential memory from being swapped out to storage or from being accessible to other applications, such as a debuggers. Alternatively, the operating system may encrypt any data in the confidential memory before it is swapped out to storage.

8 Claims, 3 Drawing Sheets

METHOD AND SYSTEM FOR DESIGNATING AND HANDLING CONFIDENTIAL MEMORY ALLOCATIONS

FIELD OF THE INVENTION

The present invention relates generally to computer memory management. More particularly, the present invention relates to designating and handling confidential memory allocations.

BACKGROUND OF THE RELATED ART

Memory management is one of the most fundamental issues of modern computer systems. Typically, a computer system will include a hierarchy of memory that ranges from a small, fast cache of main memory that is placed in front of a larger, but slower, auxiliary memory. The cache is generally implemented using a physical memory, such as RAM, while the auxiliary memory is implemented using a storage device, such as a disk drive or hard disk. Both memories are usually managed in uniformly sized units known as pages.

In order to improve performance, many computers and operating systems today implement virtual memory for the applications running on the computer. Virtual memory is where the computer system emulates that it has more memory than the computer system actually physically possesses. For example, most computer systems utilize 32-bit processors. Hence, a computer system is theoretically capable of providing a virtual memory of approximately $2^{32}$ bits or approximately 4 Gigabytes, even though the physical memory is usually much smaller.

In order to provide a virtual memory of this size, the computer system runs the application or process in a memory address space that is virtual, i.e., not tied to the physical memory. The computer system will then swap pages in and out of a cache in its physical memory in order to emulate the virtual memory. During operation, an application or process will continually requests pages using virtual memory addresses. In response, the computer system will translate the virtual memory address into a physical memory address and determine if the page is present in the cache (i.e., the page is resident). When a requested page is not present in the cache, it is called a cache "miss" (or page fault), and the requested page must be retrieved from storage. However, when the cache is full, before a new page can be brought into the cache, another page (known as the victim page) must be evicted to storage.

Many applications running on a computer system utilizes confidential or sensitive data, such as encryption keys, passwords, account numbers, and the like. Unfortunately, as noted above, an application is provided a virtual memory and portions of that virtual memory are actually swapped in/out of storage, which is generally unprotected from tampering. Any data read by a process that was originally encrypted can be found as plain text in swap storage, if the process used data that was swapped out to storage. Moreover, it is possible for passwords and the confidential data to reside in storage for long periods of time, even after rebooting the system. This is contrary to what most users expect, i.e., that all confidential data vanishes with process termination. If the integrity of the system is compromised, an untrusted party may gain access to the confidential data that has been swapped out and retained in storage.

Accordingly, it would be desirable to provide methods and systems for designating and handling confidential data.

SUMMARY

In accordance with one embodiment of the invention, a method of protecting confidential data is provided. When a request to allocate space in a virtual memory for confidential data is received, a portion of the virtual memory is marked as confidential. It is determined if a portion of a physical memory has been assigned for the confidential portion of the virtual memory. The portion of the physical memory that has been assigned for the confidential portion of the virtual memory is then marked as having confidential data.

In accordance with another embodiment of the inventions a method of protecting data allocated to a confidential area of virtual memory that is stored in physical memory is provided. When contents of the physical memory are being written to another location, contents of the physical memory that correspond to data allocated to the confidential area of the virtual memory are identified. The identified contents of the physical memory are then protected.

Additional embodiments of the present invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for designating and handling confidential memory allocations of virtual memory. In particular, the operating system provides a memory allocation flag that applications may use to indicate that data in any arbitrary area of the physical memory allocated with this flag can contain confidential data and should be handled accordingly. Alternatively, the operating system may place the confidential data in areas of the physical memory that are not directly accessible by bus mastering I/O devices. The operating system also ensures that memory allocated with this flag can be placed in physical memory. When freeing up memory, the operating system protects any data in the memory allocated with this flag. For example, the operating system may prevent the confidential memory from being swapped out to storage. Alternatively, the operating system may encrypt any data in the confidential memory before it is swapped out to storage.

Reference will now be made in detail to exemplary embodiments of the invention, which are illustrated in the accompanying drawings. Wherever possible, the same reference numbers will be used throughout the drawings to refer to the same or like parts.

Figure 1:
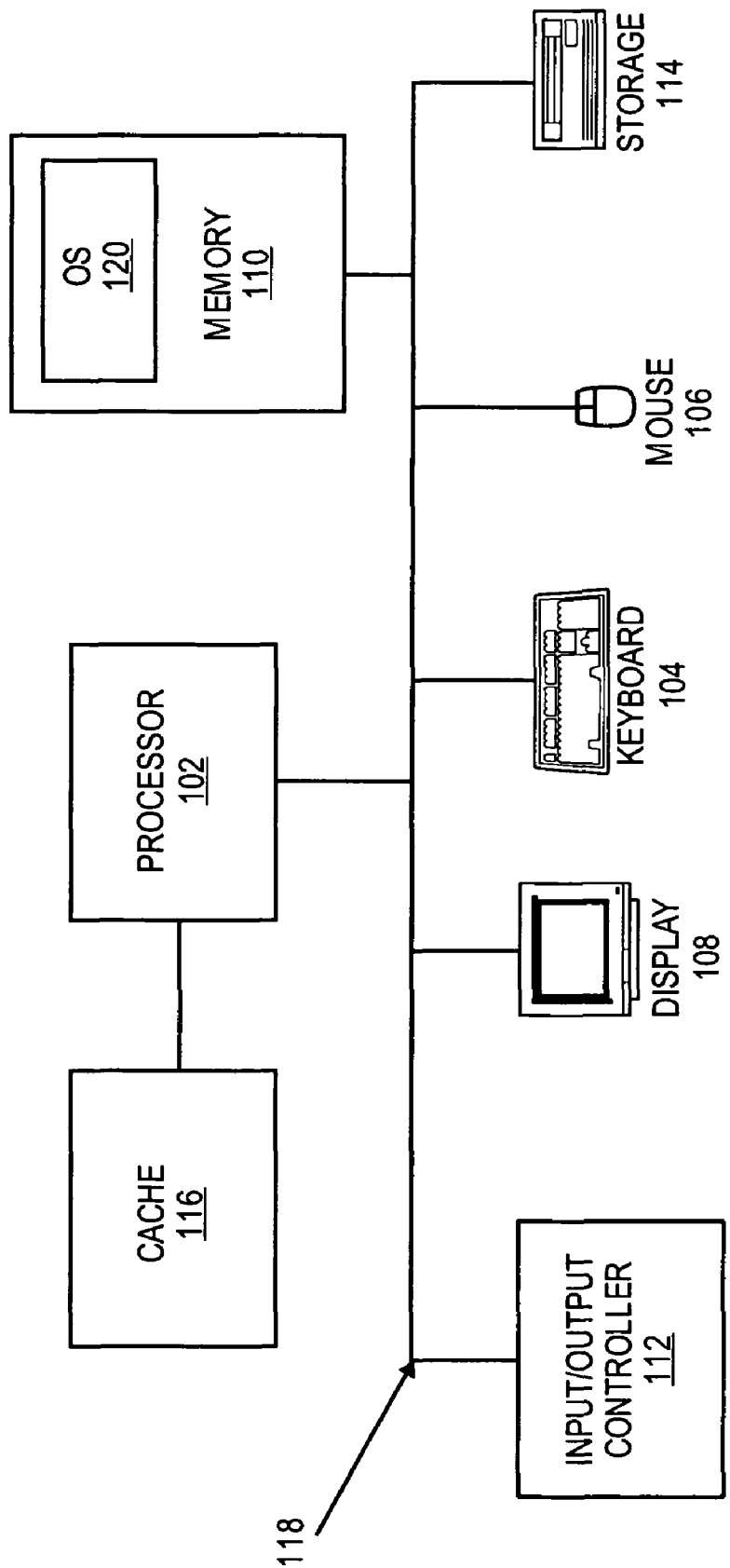
FIG. 1 illustrates an exemplary system that is in accordance with embodiments of the present invention.

FIG. 1 illustrates a computer system 100 that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache, an external cache or combinations thereof. System 100 may also be provided with additional input/output devices, such as a printer (not shown). The various components of the system 100 communicate through a system bus 118 or similar architecture.

In addition, computer system 100 may include an operating system (OS) 120 that resides in memory 110 during operation. OS 120 is an integrated collection of routines and programs that service sequencing and processing of programs and applications running on computer system 100. OS 120 may provide many services for computer system 100, such as resource allocation, scheduling, input/output control, and memory management. OS 120 may be predominantly software, but may also comprise partial or complete hardware implementations and firmware. Well known examples of operating systems that are consistent with the principles of the present invention include MAC™ OS by APPLE® COMPUTER, INC., GNU/LINUX, JAVA™ and SUN SOLAR™ by SUN® MICROSYSTEMS, WINDOWS® by MICROSOFT® CORPORATION, MICROSOFT WINDOWS® CE, WINDOWS® NT, WINDOWS® 2000, and WINDOWS® XP.

One skilled in the art will recognize that system 100 may comprise various other components, such as multiple processors, additional storage devices, etc. Such components are well known to those skilled in the art.

Figure 2:
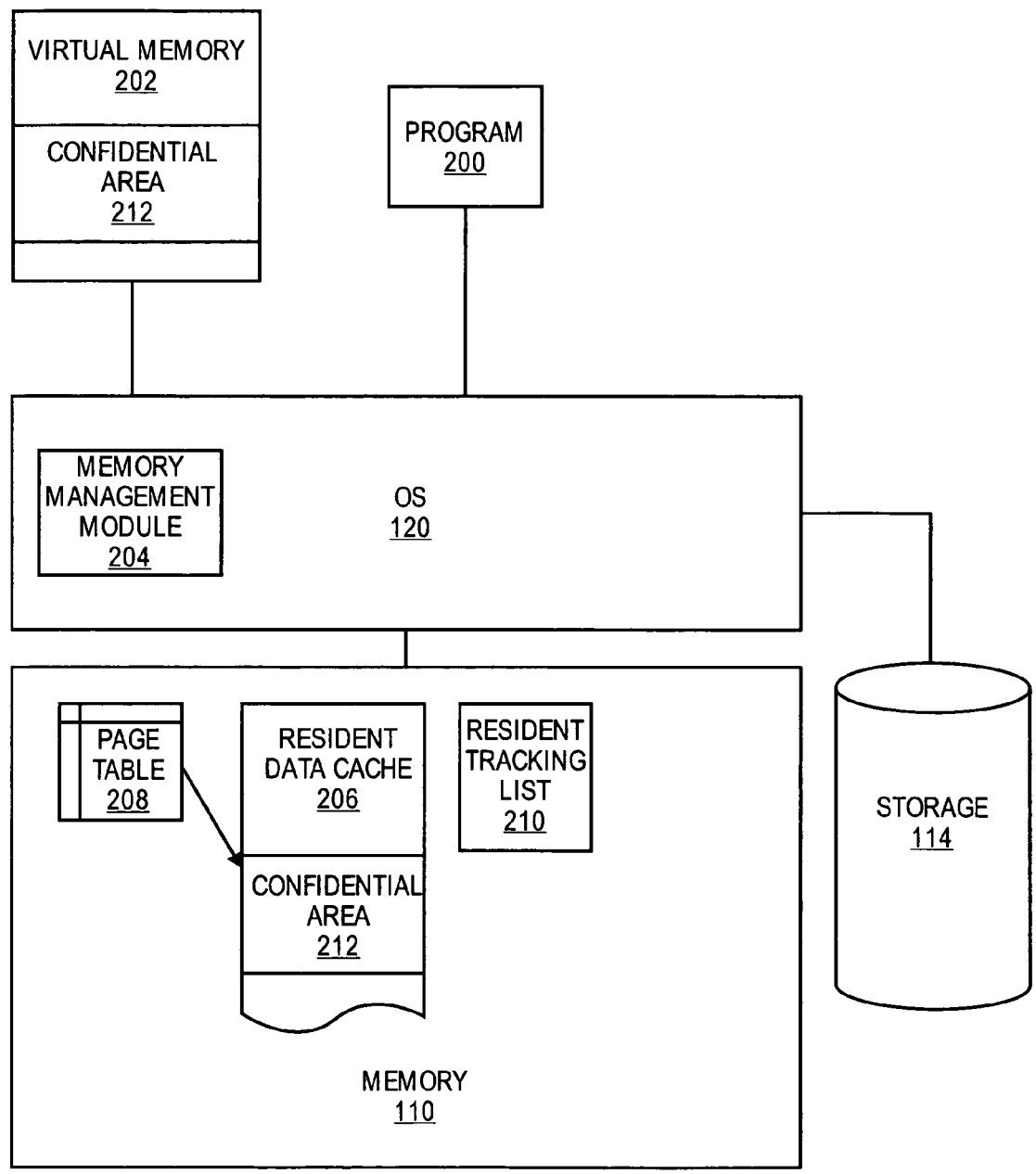
FIG. 2 illustrates an exemplary architecture of the system shown in FIG. 1.

FIG. 2 illustrates a general architecture of computer system 100 that is in accordance with embodiments of the present invention. As shown, computer system 100 is running a program 200 on OS 120. In addition, OS 120 is providing a virtual memory 202 to support the operation of program 200. OS 120 may utilize inode data stored in the memory management module 204, a page table 208, a resident data cache 206, and resident tracking list 210. OS 120 may also be coupled to storage 114 and retrieve various pages that are not stored in memory 110.

Program 200 may be any application or other program that runs on top of OS 120. Such programs are well known to those skilled in the art.

Virtual memory 202 is the memory space in which program 200 operates. As noted above, virtual memory 202 utilizes an address space that is not tied to the physical address space of memory 110. In accordance with the principles of the present invention, virtual memory 202 may comprise a confidential area 212. OS 120 may flag confidential area 212 with a flag indicating that data in this area is confidential and should be protected. For example, OS 120 may use a flag, such as "MAP_CONFIDENTIAL," to allocate any arbitrary area of virtual memory 202 for holding confidential data. In addition, OS 120 may ensure that confidential area 212 has been stored in memory 110 and not storage 114. Accordingly, memory 110 is also shown storing confidential area 212 in resident data cache 206.

Memory management module 204 is a component of OS 120 that decides which parts of virtual memory 202 are kept in memory 110 in resident data cache 206. Resident data cache 206 is the portion of virtual memory 202 that is currently resident in memory 110. Memory management module 204 may operate in conjunction with other components of computer system 100 that are not shown in FIG. 2. For example, memory management module 204 may operate with a memory management unit associated with processor 102 and maintain several data structures for managing the data that is held in resident data cache 206 and tracking relevant information for program 200 from storage 114. Some of these data structures will now be briefly described.

Page table 208 provides a mapping between the virtual address space of virtual memory 202 and the physical address space of memory 110. In some embodiments, page table 208 may be used in conjunction with a translation lookaside buffer (TLB) (not shown), which are well known to those skilled in art. Typically, page table 208 is accessed by extracting the virtual page frame number and offset of the desired data. The virtual page frame number serves as an index to page table 208 to retrieve a physical page frame number. The physical address may then be determined by multiplying the page size by the physical page frame number and adding the offset (if needed). The use and structure of page table 208 is well known to those skilled in the art.

In some embodiments, OS 120 may be configured to use demand paging. Demand paging is where only pages that are currently use by program 200 are loaded into memory 110 in resident data cache 206.

Resident tracking list 210 is a list that tracks pages accessed for program 200, which current reside in resident data cache 206. In some embodiments, some of the pages may be marked as confidential using the "MAP_CONFIDENTIAL" flag noted above. When free space must be generated, memory management module 204 will evict a page from resident data cache 206 using well known algorithms.

In some embodiments, memory management module 204 is configured to check whether a page is within a confidential area of virtual memory based on the MAP_CONFIDENTIAL flag. If the page contains confidential data, then memory management module 204 may be configured to prevent that page from being evicted to storage 114. For example, in the event of a core dump, memory management module 204 will not dump data from confidential area 212. As another example, memory management module 204 may be configured to skip over data in confidential area 212 when writing data to storage 114 during a transition of system 100 to a power saving mode. OS 120 may also apply other protections to data in confidential area 212. For example, OS 120 may prevent data in confidential area 212 from being written to a file, a socket, from being source data to another process of OS 120, or from being accessed by another program, such as a debugger.

Alternatively, memory management module 204 may be configured to permit a page with confidential data to be evicted. However, in these instances, OS 120 may then encrypt that page before it is swapped out to storage 114. Of course, OS 120 may store the encryption keys for the swapped out confidential page in a protected area of memory 110, such as confidential area 212. As another alternative, OS 120 may place the confidential data in areas of memory 110 that are not directly accessible by bus mastering I/O devices, i.e., devices that can access memory 110 without the assistance of processor 102. By placing confidential in such areas of memory 110 or using hardware assistance when available, memory management module 204 may thus increase the protection of the confidential data from being inadvertently copied to storage 114.

Figure 3:
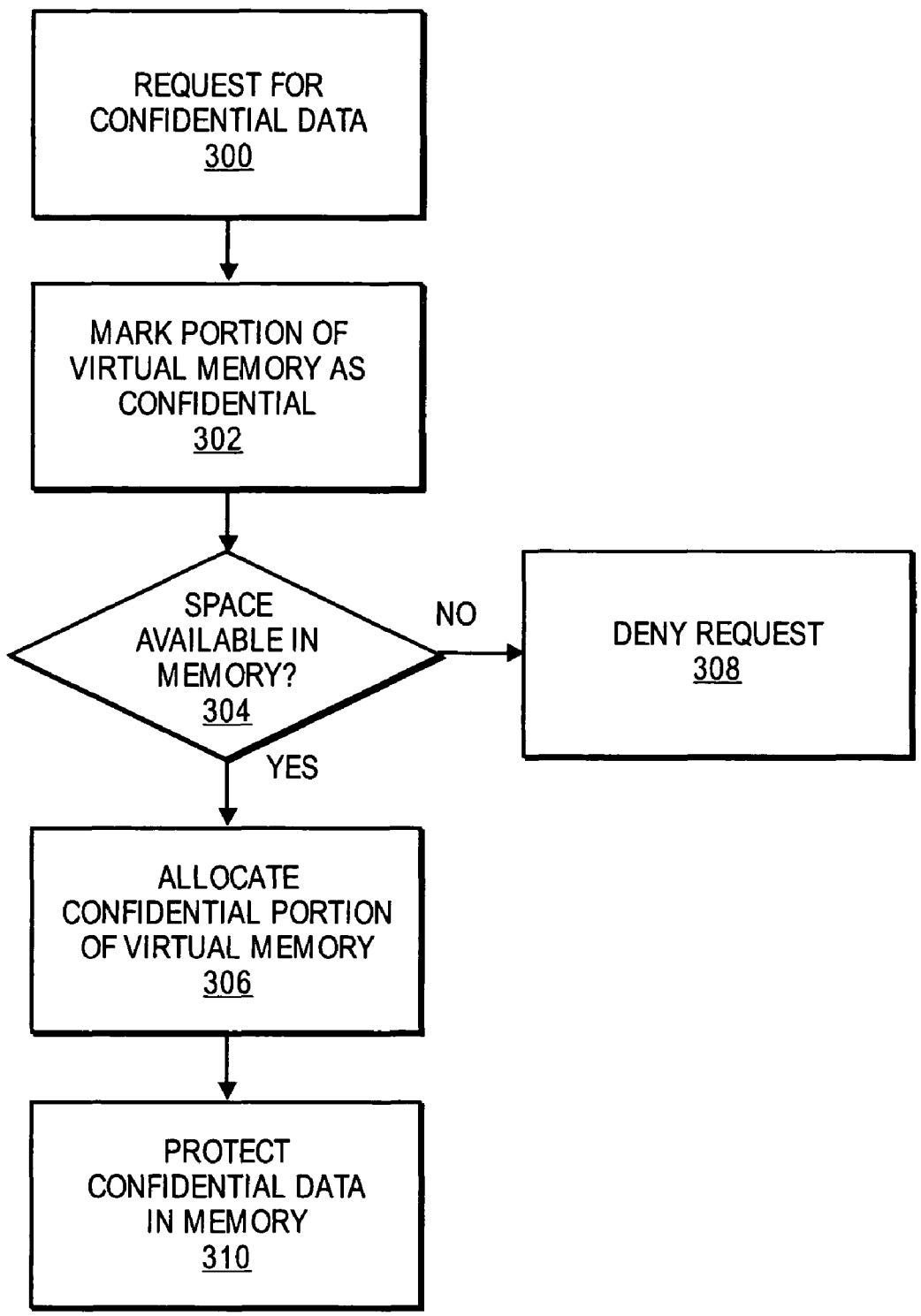
FIG. 3 illustrates an exemplary process flow that is in accordance with embodiments of the present invention.

FIG. 3 illustrates an exemplary process flow that is in accordance with the invention. In stage 300, OS 120 receives a request to allocate confidential memory for sensitive data. For example, an application running on OS 120 may request that data be allocated to confidential portion 212 by using a flag, such as MAP_CONFIDENTIAL.

In stage 302, memory management module 204 allocates an area of virtual memory 202 as confidential based on the flag. One skilled in the art will recognize that memory management module 204 may allocate any arbitrary area of memory 110 as holding confidential data based on the flag. In stage 304, memory management module 204 determines if physical memory 110 has space available for confidential portion 212 of virtual memory 202. In stage 306, if space is available, then, in stage 306, memory management module 204 allocates at least some of the available space in memory 110 for confidential portion 212. In some embodiments, if space is not available, then, in stage 308, memory management module 204 may be configured to evict one or more pages from resident data cache 206 or may refuse the request.

In stage 310, OS 120 then protects the confidential portion 212. For example, memory management module 204 may be configured to prevent that page from being evicted to storage 114. For example, in the event of a core dump, memory management module 204 will not dump data from confidential area 212. As another example, memory management module 204 may be configured to skip over data in confidential area 212 when writing data to storage 114 during a transition of system 100 to a power saving mode. OS 120 may also apply other protections to data in confidential area 212. For example, OS 120 may prevent data in confidential area 212 from being written to a file, a socket, from being source data to another process of OS 120, or from being accessed by another program, such as a debugger.

Alternatively, memory management module 204 may be configured to permit a page with confidential data to be evicted. However, in these instances, OS 120 may then encrypt that page before it is swapped out to storage 114. Of course, OS 120 may store the encryption keys for the swapped out confidential page in a protected area of memory 110, such as confidential area 212.

Other embodiments of the invention will be apparent to those skilled in the art from consideration of the specification and practice of the invention disclosed herein. For example, embodiments of the present invention may be applied to protecting confidential data when systems enter power saving modes. Typically, when entering these types of modes, a system will write the contents of memory 110 to storage device 114. In some embodiments, OS 120 is instead configured to write normal or non-confidential portions of memory 110 to storage 114. However, OS 120 may skip over writing confidential portions of memory 110 and noting which areas of memory 110 were skipped. OS 120 may then determine which processes utilized data in these confidential areas. Thus, when operations resume, OS 120 may provide a warning to indicate that some or all of the confidential portions of memory 110 were not copied to storage 114, or terminate these processes in order to protect the confidential data. One skilled in the art will recognize that other variations may be implemented.

What is claimed is:

1. A method of protecting confidential data from copying, comprising:
   storing confidential data in a confidential section of virtual memory, wherein storing the confidential data in the confidential section of virtual memory comprises:
   mapping the confidential section of virtual memory to an address space in a first physical memory device;
   storing the confidential data in the first physical memory device; and
   marking the address space in the first physical memory device as having confidential data;
   receiving a request to copy data stored in the address space in the first physical memory device to a second physical memory device, wherein the second physical memory device has more capacity and slower memory access speed than the first physical memory device;
   determining that the address space in the first physical memory device has been marked as having confidential data;
   encrypting the confidential data in the address space in the first physical memory in response to determining that the address space in the first physical memory device has been marked as having confidential data; and
   storing the encrypted confidential data in the second physical memory.

2. The method of claim 1, further comprising:
   storing one or more keys used to encrypt the confidential data in a protected memory area.

3. The method of claim 1, wherein the request to copy data stored in the address space in the first physical memory device is received as a result of a core dump.

4. The method of claim 1, wherein the request to copy data stored in the address space in the first physical memory device is received as a result of a power-saving operation.

5. A system for protecting confidential data from copying, comprising: a processing system comprising one or more processors; and
   a memory system comprising one or more computer-readable media, wherein the memory system includes at least a first physical memory device and a second physical memory device, the second physical memory device having more capacity and slower memory access speed than the first physical memory device, and wherein the computer-readable media store instructions that, when executed by the processing system, cause the processing system to perform operations comprising:
   storing confidential data in a confidential section of virtual memory, wherein storing the confidential data in the confidential section of virtual memory comprises:
   mapping the confidential section of virtual memory to an address space in the first physical memory device;
   storing the confidential data in the first physical memory device; and
   marking the address space in the first physical memory device as having confidential data;
   receiving a request to copy data stored in the address space in the first physical memory device to the second physical memory device;
   determining that the address space in the first physical memory device has been marked as having confidential data;
   encrypting the confidential data in the address space in the first physical memory in response to determining that the address space in the first physical memory device has been marked as having confidential data; and
   storing the encrypted confidential data in the second physical memory.

6. The system of claim 5, the operations further comprising:
   storing one or more keys used to encrypt the confidential data in a protected memory area.

7. The system of claim 5, wherein the request to copy data stored in the address space in the first physical memory device is received as a result of a core dump.

8. The system of claim 5, wherein the request to copy data stored in the address space in the first physical memory device is received as a result of a power-saving operation.

* * * * *